May 23, 1967 — J. J. QUACKENBUSH ETAL — 3,321,125
HEAVY DUTY 5-LAYER THERMOPLASTIC SHIPPING BAG
Filed Jan. 3, 1966

JOHN J. QUACKENBUSH
HERBERT O. CORBETT
*INVENTOR.*

BY

3,321,125
HEAVY DUTY 3-LAYER THERMOPLASTIC SHIPPING BAG
John Joseph Quackenbush, Monroe, and Herbert Oliver Corbett, Bridgeport, Conn., assignors to National Distillers and Chemical Corporation, New York, N.Y., a corporation of Virginia
Filed Jan. 3, 1966, Ser. No. 518,284
6 Claims. (Cl. 229—55)

This invention relates to thermoplastic shipping bags, and more specifically relates to a novel three-layer thermoplastic bag for heavy duty application which has an outer layer of a low stiffness vinyl acetate copolymer, a central layer of a low density and low stiffness polyethylene and an interior layer of a high density, high stiffness copolymer material with respect to the outer and central layers. This invention is a continuation-in-part of copending application Ser. No. 350,220, filed Mar. 9, 1964 in the name of Herbert O. Corbett, entitled Laminated Products, and Methods and Apparatus for Producing Same and assigned to the assignee of the present application.

Plastic bags formed of tubular or flat webs of extruded plastic material are well known to the art. Where such bags are made for heavy duty application and are of relatively thick gauge, which would include the gauge range of from 3.5 mils to 12.0 mils, they are useful for the packaging of such materials as fertilizer, peat, feed corn and numerous other products, with the bags carrying bulk weights of from 20 to 100 lbs. Such heavy duty bags, however, because of the nature of the plastics which have been used in their manufacture, have been unsuitable for the packaging of abrasive products or irregularly shaped products, or products which are hydroscopic and which are normally packaged at elevated temperatures such as salt, which is packed at temperatures of 175° to 210° F., which adversely affects some plastic materials. Moreover, with materials previously used for such bags, the interior surfaces tend to cling together and cannot be easily opened, while the outer surfaces are slippery and difficult to handle.

The principle of the present invention is to provide a novel three-layer multiwall plastic bag which is abrasion-resistant, and can be packed at high temperatures and which has superior handling characteristics. More particularly, and in accordance with the invention, a heavy duty bag is formed with an outer layer of a vinyl acetate copolymer, a central layer of low density polyethylene and an interior layer of a high density copolymer such as polyethylene or polypropylene.

This structure is formed in a laminar flow extrusion process, as described in above noted copending application Ser. No. 350,220 so that separate but intimately bonded layers of the diverse materials are formed. The outer layer of the vinyl acetate copolymer imparts, to the outside of the bag, the desired qualities of high impact resistance, in view of its extensibility or low stiffness, ease of heat sealing, a good printing surface, an attractive glossy appearance, and controllable surface friction which is slightly "tacky" for ease of handling. This outer layer, which is of a relatively expensive material, would comprise approximately from 5 to 15% of the total wall thickness.

The central layer is of an inexpensive low density polyethylene which provides the bulk of the bag body and will constitute from 70 to 90% of the wall thickness.

The interior layer is of a high density copolymer such as a high density copolymerized linear polyethylene or polypropylene. This inner layer will have a stiffness greater than the stiffness of the outer and central layers and has a high melting point and high puncture resistance. Moreover, it does not tend to "block," or stick to itself so that the bag panels can easily slide over one another to permit easy opening of the bag. Furthermore, by using a relatively stiff material for the inner layer, the bag lips will tend to curl open, further simplifying the manual or automatic opening of the bag. This inner layer will then form from 5 to 15% of the total bag wall thickness.

Accordingly, a primary object of this invention is to provide a novel heavy duty thermoplastic shipping bag.

Another object of this invention is to provide a novel heavy duty thermoplastic shipping bag which has good abrasion-resistance characteristics.

Another object of this invention is to provide a novel heavy duty thermoplastic shipping bag which has good high temperature characteristics.

A further object of this invention is to provide a novel three-layer multiwall thermoplastic shipping bag which has high abrasion-resistance, high puncture and heat resistivity, and withstands rough handling.

Yet another object of this invention is to provide a novel heavy duty bag which is inexpensive by being formed of about 90% of low density polyethylene which has a low block, high stiffness interior layer, and a low stiffness and relatively high friction outer layer which has good sealing and printing characteristics.

These and other objects of this invention will become apparent from the following description when taken in connection with the drawings, in which.

Figure 1:
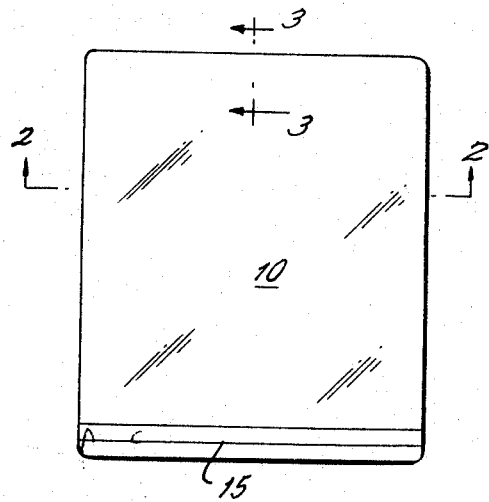
FIGURE 1 is a front plan view of a bag constructed in accordance with the invention.
Figure 2:
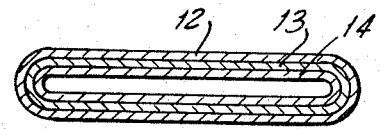
FIGURE 2 is a cross-sectional view of FIGURE 1 taken across the line 2—2 in FIGURE 1.
Figure 3:
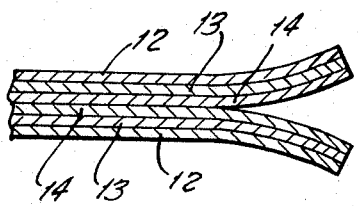
FIGURE 3 is a partial cross-sectional view of FIGURE 1 taken across the line 3—3 in FIGURE 1.

Referring now to the figures, there is illustrated therein a typical bag 10 constructed in accordance with the invention which is a non-gusseted bag for the packaging of 100 lbs. of peat moss and which has typical bag dimensions of a width of 23 inches and a height of 44 inches. The wall thickness of the plastic material of the bag of FIGURES 1, 2 and 3 will range from 3.5 to 12 mils, with the bag 10 formed of three layers 12, 13 and 14 which are respectively of a vinyl acetate copolymer, a low density polyethylene, and the high density copolymer. The thickness of the layers will range from 0.4 to 1.0 mil for the inner layer 14, and from 0.5 to 2.0 mils for the outer layer 12, with the central layer 13 having a thickness forming about 70 to 90% of the total wall thickness.

The inside high density copolymer layer 14 was made of Phillips Marlax 5003, available from Phillips and is a copolymerized linear polyethylene having a density of 0.95, and a thickness of 0.5 mil.

The central layer 13, which forms the bulk of the bag material and had a thickness of 4.0 mils, was Petrothene 127, available from the U.S.I. Chemical Corp., and is an inexpensive low density polyethylene.

The outer vinyl acetate copolymer layer 12 was Ultrathene, UE 630, available from the U.S.I. Chemical Corp., and was 0.5 mil thick.

Bags formed in this manner showed superior appearance and printability due to the vinyl acetate copolymer outer layer. In addition, good heat seals and high abrasion resistance was found in the outer layer. The inner layer showed good puncture resistance against materials packed in the bag and had provided good results in high temperature packing applications at hot water temperature exceeding 200° F.

The completed bag proved to have excellent handling abilities due to the combination of the high friction outer surface which could be easily gripped, and the non-blocking interior layer which allows the interior of the bag panels to slide easily over one another. Moreover, the bag is easily opened since the lip edges curl outwardly due to the high stiffness inner layer compared to the low stiffness outer and central layers, whereby differential contraction during extrusion of the bag builds a tendency to curl outwardly (as in a heated bimetal) in the bag panels.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A bag of multilayer thermoplastic material and comprising opposing front and rear panels defining closed bottom and side portions and an open end; said multilayer material comprising an inner layer of a high density copolymer, a central layer of low density and low stiffness polyethylene and an outer layer of polypropylene and a low stiffness vinyl acetate copolymer.

2. The bag as set forth in claim 1 wherein said material has a total thickness in the range of 3.5 mils to 12.0 mils.

3. The bag as set forth in claim 2 wherein said inner layer, central layer and outer layer have thicknesses in the ranges of 5–15%, 70–90%, and 5–15% of the total thickness, respectively.

4. The bag as set forth in claim 2 wherein said front and rear panels curl outwardly from one another at said open end.

5. A bag as set forth in claim 1 where the high density copolymer from which the inner layer is produced is polyethylene.

6. A bag as set forth in claim 1 where the high density copolymer from which the inner layer is produced is polypropylene.

No references cited.

JOSEPH R. LECLAIR, *Primary Examiner.*

R. PESCHOCK, *Assistant Examiner.*

UNITED STATES PATENT OFFICE
CERTIFICATE OF CORRECTION

Patent No. 3,321,125            May 23, 1967

John Joseph Quackenbush et al.

It is certified that error appears in the above identified patent and that said Letters Patent are hereby corrected as shown below:

Column 3, lines 20 and 21, cancel "polypropylene, and a low stiffness".

Signed and sealed this 25th day of November 1969.

(SEAL)
Attest:

Edward M. Fletcher, Jr.            WILLIAM E. SCHUYLER, JR.
Attesting Officer                      Commissioner of Patents